July 1, 1924.

B. M. W. HANSON 1,499,773

WORK DRIVER FOR LATHES

Filed Jan. 25, 1922

Inventor
Bengt. M. W. Hanson
by T. Clay Lindsey
His Attorney

Patented July 1, 1924.

1,499,773

UNITED STATES PATENT OFFICE.

BENGT M. W. HANSON, OF HARTFORD, CONNECTICUT.

WORK DRIVER FOR LATHES.

Application filed January 25, 1922. Serial No. 531,551.

*To all whom it may concern:*

Be it known that I, BENGT M. W. HANSON, a citizen of the United States, and resident of Hartford, county of Hartford, State of Connecticut, have invented certain new and useful Improvements in a Work Driver for Lathes, of which the following is a specification.

The object of the present invention is to provide a simple and effective chuck having various features of novelty and advantage, and more particularly to provide a chuck with a work center for accurately positioning the work and means for gripping the work and holding it in engagement with the work center.

Figure 1:
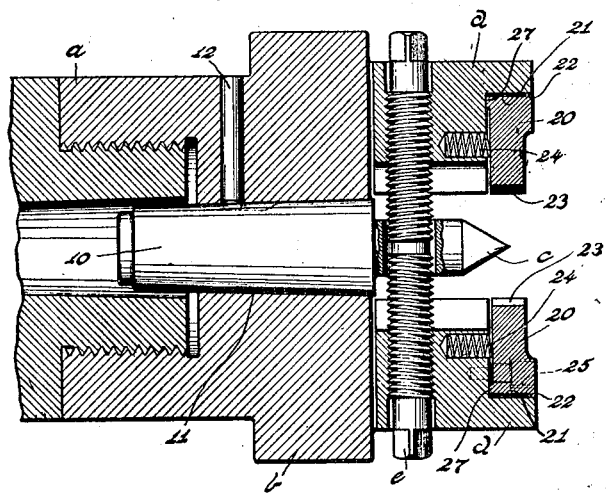
Figure 2:
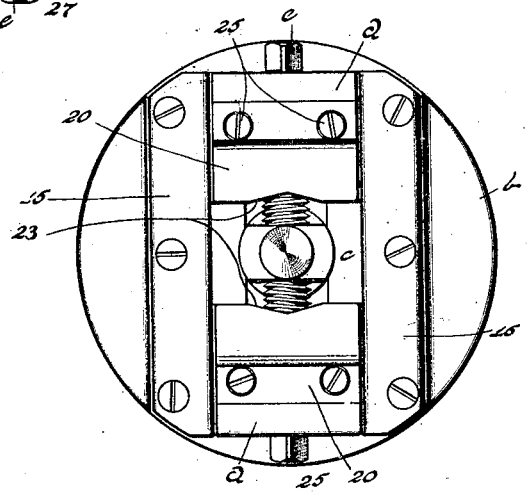
Figure 3:
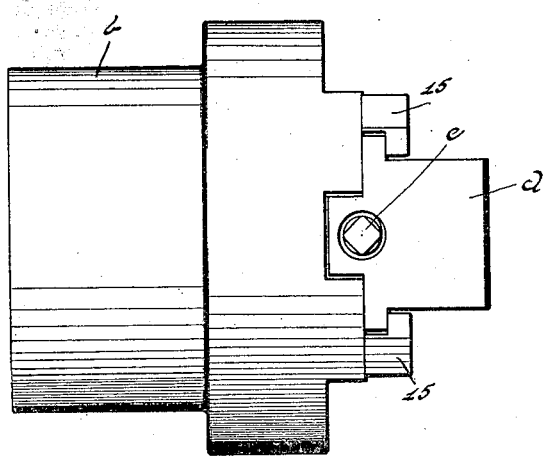

In the accompanying drawings, wherein I have shown the preferred embodiment of the invention, Fig. 1 is a sectional view taken longitudinally and centrally through my improved chuck, Fig. 2 is a front view, and Fig. 3 is a top view.

Referring to the drawings in detail, $a$ denotes a suitable tool spindle, such as a head spindle of a metal working machine. Removably secured to the forward end of the spindle is a head or body $b$ provided with an axially positioned work center $c$ and a pair of jaws $d$ adapted to be simultaneously moved in opposite directions by an operating screw $e$.

In the present illustrative disclosure of the invention, the work center $c$ has a tapered shank 10 wedgedly fitting in a similarly tapered opening 11 in the head. The shank is maintained against rotation relative to the head by a pin or key 12.

Secured to the front face of the head are guides 15 in which are slidably mounted for radial movement, the jaw blocks $d$. There is sufficient clearance between the side edges of the jaw blocks and the guides 15 (as is most clearly shown in Fig. 3) to permit of a laterally floating movement of the jaws so that they may accommodate themselves to properly grip the work. The screw $e$ has left and right handed threaded portions in threaded engagement with the respective jaw blocks $d$ so that when the screw is rotated in one direction the blocks are moved inwardly towards each other to grip the work, and when the screw is moved in the opposite direction the jaws move away from each other to release the work. As is shown, the screw passes freely through an enlarged opening in the work center $c$. It will be noted that the blocks, together with the screw, are capable of a free or floating movement radially of the work center, and thus the jaws will automatically adjust themselves to grip the work with equal force without tending to disturb the work relatively to the center or, in fact, exert any lateral strains on said center. It will be seen that the screw $e$ is diametrically disposed relative to the head $b$, the advantage of this arrangement being that when the screw is turned the jaws are brought squarely against the work without introducing any leverage action or cramping of the parts as would be the case should the screw be located to one side of the axis of the head.

For the purpose of causing the jaws to urge the work towards and hold it in engagement with the work center, the jaw blocks are provided with jaw members 20 which are so arranged that when they engage the work they will exert a longitudinal pressure thereon in a direction towards the work center. In the present instance, each of the jaws is provided along the forward edge of its outer face 21 with a rib 22 engaging against the jaw block $d$. This rib 22 is forwardly of the active gripping face 23 of the jaw member and thus constitutes a fulcrum, so to speak, about which the jaw is canted or cocked in a direction longitudinally towards the work spindle when the jaw members are brought into engagement with the work. The lands or ribs 27 space the inner ends of the jaw members from the jaw blocks. The jaw members are urged into normal position (as shown in Fig. 1) by springs 24 and are connected to the jaw blocks by screws 25, there being sufficient clearance between the screws and the jaw members to allow the latter to swing about their fulcrums as stated.

It is, of course, obvious that my invention is susceptible of various modifications and changes which are within the spirit of the invention without departing from the scope of the following claim, it being understood that the present disclosure of my invention is by way of illustration only and it is not to be taken as restrictive of my invention.

I claim as my invention:—

In a device of the character described, a rotatable head, an axial work center carried thereby and adapted to engage the end of the work, jaw blocks mounted for radial movement on said head, means for moving said jaw blocks towards each other, and jaw members fulcrumed on said blocks forwardly of the active faces of said jaw members whereby, when said jaw members engage the work, they swing about their fulcrums and thus force the work towards and hold the work against said work center.

BENGT M. W. HANSON.